United States Patent [19]

Hunter

[11] 3,925,466

[45] Dec. 9, 1975

[54] REACTION PRODUCT OF OXALYLDIHYDRAZIDE AND BIS(SULFONYL HALIDE)

[75] Inventor: Byron A. Hunter, Woodbridge, Conn.

[73] Assignee: Uniroyal, Inc., New York, N.Y.

[22] Filed: May 8, 1974

[21] Appl. No.: 468,060

Related U.S. Application Data

[62] Division of Ser. No. 354,819, April 26, 1973, abandoned.

[52] U.S. Cl. .... 260/543 R; 260/2.5 R; 260/2.5 AE; 260/2.5 N; 260/2.5 HA; 260/2.5 HB; 260/556 A; 260/556 AR; 260/556 H

[51] Int. Cl.$^2$ ................................. C07C 143/70
[58] Field of Search ............................ 260/543 R

[56] References Cited

UNITED STATES PATENTS 3,235,519    2/1966    Hunter .......................... 260/2.5

*Primary Examiner*—John F. Terapane
*Attorney, Agent, or Firm*—Willard R. Sprowls, Esq.

[57] ABSTRACT

Certain oxalylbis(sulfonyl hydrazides) are useful as blowing agents for polymeric materials. Some of these compounds are themselves new.

2 Claims, No Drawings

REACTION PRODUCT OF OXALYLDIHYDRAZIDE AND BIS(SULFONYL HALIDE)

This is a, division of application Ser. No. 354,819, filed Apr. 26, 1973, now abandoned.

This invention relates to the production of gas-expanded polymers with a new class of chemical blowing agents, namely oxalylbis(sulfonyl hydrazides) and oligomers thereof. Some of these blowing agents are themselves new compositions of matter.

Blowing agents which decompose at relatively high temperatures are not new. U.S. Pat. 3,235,519 discloses using sulfonyl semicarbazides as blowing agents for polymeric materials which soften above 170°C. These blowing agents are particularly suitable for expanding high density polyethylenes, and many other rubbery and plastic polymers, but they are unsuitable for expanding certain polymers because they produce ammonia gas upon decomposition. Ammonia gas tends to attack certain polymeric materials such as polycarbonates and polyesters, and, in some instances, reacts with the metals used for the construction of molding equipment.

This invention provides a new class of blowing agents which begin to decompose non-explosively, and controllably, at temperatures not lower than 200°C., and preferably not lower than 225°C., but have high heat stability at temperatures below 200°C. Thus, they are useful for expanding polymeric materials that soften at, or below, these high temperatures.

The term "polymeric material" means homopolymers, interpolymers, graft polymers, and mixtures and blends of two or more of these, and includes thermoplastic, thermosetting and rubbery polymers. In particular, the new blowing agents are useful for expanding polymers that have high processing temperatures such as the polycarbonates, phenylene oxide-based resins, polyaryl sulfones, the various nylons, polyesters, certain polystyrenes, polypropylene, poly(styreneacrylonitrile), polyacetals, urethane elastomers, polyvinyl polymers, polyphenylene sulfide, polymethyl pentene, certain polyethylenes, polyimides, polyaryl ethers, ABS polymers, polyacrylics, cellulosic polymers, halogenated polymers, especially the fluoroplastics, poly(ethylene vinyl acetate), and polymer alloys.

Broadly, the new class of blowing agents includes certain oxalylbis(sulfonyl hydrazides), and oligomeric condensation products of oxalic hydrazide and one or more polyhaloformates. Upon decomposition, these substances produce no ammonia. Rather, they produce primarily carbon dioxide, carbon monoxide, and alcohols, and smaller amounts of nitrogen.

Generally, the amount of blowing agent used will depend on the nature of the polymer to be expanded, and the desired density of the foam to be produced. Usually, 0.05 to 15, and, more often, 0.1 to 5.0 parts blowing agent are employed, based on 100 parts of polymer by weight. The blowing agents can be used alone, or in combination with other blowing agents. Activating substances can be used to increase the gas-releasing efficiency, or to lower the normal decomposition temperature, of the blowing agents of the invention. Other additives such as plasticizers, fillers, nucleating agents, and the like, can also be added to the polymer to be expanded.

More particularly, the oxalylbis(sulfonyl hydrazides) are those of the general formula:

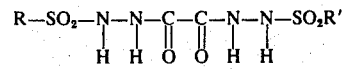

where R and R' are the same or different but are preferably the same, and are hydrocarbyl groups such as branched-chain and straight-chain alkyl radicals having 1 to 8 carbon atoms: cycloalkyl radicals containing 5 to 8 carbon atoms, especially cyclohexyl: and aryl, aralkyl, and alkaryl radicals containing 6 to sulfonylhydrazide), 10 carbon atoms, such as phenyl, benzyl, the tolyls and the xylyls.

Examples of these compounds are: oxalylbis(methane sulfonylhydrazide), oxalylbis(ethane sulfonylhydrazide), oxalylbis(n-propane sulfonylhydrazide), oxalylbis(isopropane sulfonylhydrazide), oxalylbis(n-butane sulfonylhydrazide), oxalylbis(sec-butane sulfonylhydrazide), oxalylbis(tert-butane sulfonylhydrazide), oxalylbis(isobutane sulfonylhydrazide), oxalylbis(n-pentane sulfonylhydrazide), oxalylbis(sec-pentane sulfonylhydrazide), oxalylbis(2-methylbutane sulfonylhydrazide), oxalylbis(3-methylbutane sulfonylhydrazide), oxalylbis(n-hexane sulfonylhydrazide), oxalylbis(2,3-dimethylbutane sulfonylhydrazide), oxalylbis(heptane sulfonylhydrazide), oxalylbis(octane sulfonylhydrazide), oxalylbis(isooctane sulfonylhydrazide), oxalylbis(2-ethylhexane sulfonylhydrazide), oxalylbis((cyclohexane sulfonylhydrazide), oxalylbis(cyclooctane sulfonylhydrazide), oxalylbis(benzene sulfonylhydrazide), oxalylbis(phenylmethane sulfonylhydrazide), oxalylbis(toluene sulfonylhydrazide), oxalylbis(xylene sulfonylhydrazide), oxalylbis(napthalene suflonylhydrazide), 1-methylsulfonyl-6-ethylsulfonyloxalyldihydrazide, 1-methylsulfonyl-6-isopropylsulfonyloxalyldihydrazide, 1-isopropylsulfonyl-6-phenylsulfonyloxalyldihydrazide, and 1-methylsulfonyl-6-cyclohexylsulfonyloxalyldihydrazide.

These compounds can be made by reacting oxalyldihydrazide with sulfonyl halides in the presence of an acid acceptor such as ammonium hydroxide, sodium hydroxide, sodium carbonate or sodium bicarbonate. This reaction is usually effected in a solvent or dispersant at temperatures in the range of 0 to 100°C., at atmospheric pressure, and at a mole ratio of halide to dihydrazide of from 3:1 to 2:1, preferably from 2.2:1 to 2:1. A common solvent for the reactants is ordinarily used, and water, or alcohols such as methanol, ethanol, isopropanol, and the like, or mixtures of water and alcohols may be used.

The second class of blowing agents of this invention are the oligomers made by reacting bis(sulfonyl halides) and oxalyldihydrazide. More specifically, these oligomers are those of this general formula:

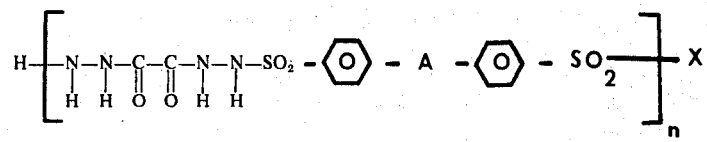

where $n$ is a number in the range 1 to 100, preferably 2 to 50, X is chlorine, bromine or iodine, and A is a single bond, or a divalent radical selected from the group consisting of oxygen, alkylene of 2 to 6 carbon atoms, alkylidene of 2 to 6 carbon atoms, sulfur, sulfonyl, sulfoxide, and oxydialkylene containing 4 to 12 carbon atoms. Preferably, A is a single bond, or a radical selected from oxygen, sulfur, and an alkylene group of 2 to 4 carbon atoms. If cyclization of these oligomers occurs, the terminal hydrogen and halogen radicals will not be present. These oligomers are themselves new compounds.

These oligomers can be made by condensing oxalic dihydrazide with one or more bis(sulfonyl halides), especially the chlorides, at a temperature in the range 0° to 100°C., at ambient or atmospheric pressure, and at a mole ratio of dihydrazlde to halide of 1.1:1 to 1:1.1. Usually, the reaction is effected in a solvent or dispersant such as water, one or more alcohols, or mixtures of two or more of these, and in the presence of an acid acceptor.

The following examples illustrate the preparation of some of the oxalylbis(sulfonyl hydrazides) and oligomers of this invention, their efficiency as gas-producing agents upon decomposition, and their use as blowing agents for producing expanded polymeric materials.

EXAMPLE I

Preparation of Oxalylbis(Benzene Sulfonyl Hydrazide)

One hundred seventy-six and one-half grams (g)(0.1 mole) of benzene sulfonyl chloride was dissolved in 500 milliliters (ml) ethylene dichloride in a 2-liter, 3-necked flask. As the mixture was stirred, 59.0 g. (0.5 mole) of oxalyldihydrazide, and then 80 g (1.0 mole) of 50% sodium hydroxide in 500 ml water were added. The mixture was stirred until a white solid precipitate formed, and the pH became neutral. The product was filtered, washed with water, and dried. Yield was 120 g. This product decomposed toproduce blowing gases when heated to 260°C.

This product was further purified by dissolution in ammonium hydroxide, filtration, and acidification with dilute sulfuric acid. The product was then filtered, washed well with water, and dried to yield 92 g. of a compound that began to decompose, and produce blowing gases, at 267°C. Analysis of the final product showed: Percent nitrogen calculated, 14.0%, found 14.4%.

EXAMPLE II

Preparation of Oxalylbis(p-Toluene Sulfonyl Hydrazide)

In a three-necked, two-liter flask, a mixture of 190.5 g (1.0 mole) of p-toluene sulfonyl chloride in 500 ml diethylene chloride, 59.0 g (0.5 mole) oxalyldihydrazide, and 80 g (1.0 mole) of 50% sodium hydroxide in 500 ml water was formed and stirred until a white precipitate formed, and the pH became neutral. This product was filtered, washed well with water, and dried to yield 114 g. The product was further purified by dissolving it in a concentrated ammonium hydroxide solution, filtering, and acidifying with dilute sulfuric acid. This product weighed 95 g and began to decompose, and produce blowing gas, at 268°C. Analysis of the product showed: percent nitrogen calculated, 13.21%; found, 12.87%.

EXAMPLE III

Preparation of Oligomer from 4,4'-Biphenylenebis(Sulfonyl Chloride) and Oxalyldihydrazide To a one-liter, round-bottomed, three-necked flask, equipped with reflux condenser and agitator, were added 35.1 g (0.1 mole) of 4,4'-biphenylenebis(sulfonyl chloride), 11.8 g (0.1 mole) oxalyldihydrazide, 17.4 g (2.2 moles) of sodium bicarbonate and 250 ml ethanol. The mixture was heated to reflux temperature (ca. 78°C.) with stirring, and was refluxed for 4 hours; carbon dioxide evolved continuously. When evolution stopped, the mixture was cooled to room temperature, washed with 500 ml water, shaken, filtered, washed again, filtered, and dried. The product began to decompose and produce blowing gases at 290°C., and produced 70 cubic centimeters of gas per gram weight (cc/g), upon decomposition.

EXAMPLE IV

Preparation of Oligomer from 4,4'-Oxybis(Benzene Sulfonyl Chloride) and Oxalyldihydrazide To a one-liter, round-bottomed, three-necked flask, equipped with reflux condenser and agitator, were added 73.4 g (0.2 mole) of 4,4'-oxybis(benzene sulfonyl chloride), 23.6 g (0.2 mole) oxalyldihydrazide, 35 g sodium bicarbonate, and 500 ml ethanol. The mixture was refluxed overnight at 78°C. The product was washed with water and filtered twice, then dried at 110°C. This product began to decompose, and release blowing gases, at 280°C., and produced 115 g/cc of gases upon decomposition.

In Examples III and IV, the gas evolution data were obtained as follows. The oligomer was decomposed in a device consisting of a 100-cc graduated burette attached, through capillary tubing, to a decomposition tube immersed in a stirred, silicone fluid bath. Mercury was charged to the burette and leveling bulb to confine the evolved gas.

From 0.2 to 0.3 g of each blowing agent was charged to the decomposition tube. Six ml paraffin oil was added, and the tube was attached to the capillary leading to the burette. The tube was immersed in the bath, which had been heated to a temperature about 500°C. below the expected decomposition temperature. Heating and stirring continued steadily until gas evolved from the compound; the decomposition temperature was noted. The system was adjusted to room temperature; the pressure, to atmospheric; and the gas volume was corrected to standard conditions, and calculated.

EXAMPLE V

Expansion of Polysulfone with Oxalylbis(Sulfonyl Hydrazides)

Each of the hydrazides of Examples I and II, was tumble-mixed with polysulfone pellets (P-1700 polysulfone available from Union Carbide Co., U.S.A.). The coated pellets were separately introduced into an extruder (Laboratory Plastic Extruder, Table Model, made by Wayne Machine & Die Co., and having a 0.75 inch diameter and a length/diameter ratio of 20:1) at a screw speed of 57 rpm, a first zone operated at 282°C.; a second, at 293°C., and a diehead temperature of 282°C. The temperature of each expanded, extruded plastic sample at the diehead was 285°C. Polysulfone pellets containing no blowing agent were also extruded under the same conditions, and had a specific gravity of 1.22 g/cc. Polysulfone expanded with oxalylbis(benzene sulfonyl hydrazide) had a density of 0.95 g/cc, and with oxalylbis(p-toluene sulfonyl hydrazide), 0.87 g/cc. These data prove that the blowing agents of the invention are highly effective for controllably expanding polymeric materials that are processed at temperatures above 200°C.

Having thus described my invention, what I claim and desire to protect by Letters Patent is:

1. An oligomer having the general formula:

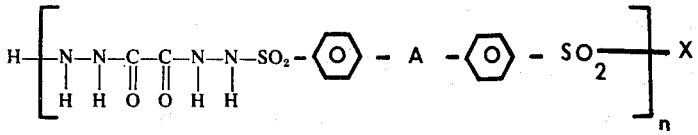

where $n$ is a number from 1 to 100, X is chlorine, bromine or iodine, and A is a single bond, or a radical selected from the group consisting of oxygen, sulfur, sulfoxide, sulfone, and alkylene of 2 to 6 carbon atoms, an alkylidene of 2 to 6 carbon atoms, and an oxydialkylene of 4 to 12 carbon atoms.

2. An oligomer made by reacting oxalyldihydrazide with an equimolar amount of a compound selected from the group consisting of 4,4'-biphenylenebis(sulfonyl chloride) and 4,4'-oxybis(benzene sulfonyl chloride) in the presence of sodium bicarbonate and ethanol at refluxing temperature for a time which, in the case of 4,4'-biphenylenebis(sulfonyl chloride), is four hours and, in the case of 4,4'-oxybis(benzene sulfonyl chloride), is overnight, the product of the latter reaction producing, on being heated at 280°C., about 115 cubic centimeters of gas per gram weight.

* * * * *